United States Patent [19]

Fischer et al.

[11] Patent Number: 5,747,568
[45] Date of Patent: May 5, 1998

[54] THERMOPLASTIC MOLDING MATERIAL

[75] Inventors: Wolfgang Fischer, Ludwigshafen; Norbert Güntherberg, Speyer, both of Germany

[73] Assignee: BASF Aktiengesellschaft, Ludwigshafen, Germany

[21] Appl. No.: 638,593

[22] Filed: Apr. 29, 1996

[30] Foreign Application Priority Data

May 4, 1995 [DE] Germany .................. 195 16 283.8

[51] Int. Cl.$^6$ .................. C08K 5/15; C08K 5/36
[52] U.S. Cl. .................. 524/110; 524/304; 524/742; 524/751
[58] Field of Search .................. 524/110, 304, 524/742, 751

[56] References Cited

U.S. PATENT DOCUMENTS

| | | | |
|---|---|---|---|
| 4,303,564 | 12/1981 | Kuroshima et al. | 260/23 |
| 4,404,304 | 9/1983 | Horner et al. | 524/110 |
| 4,489,099 | 12/1984 | Shaheen et al. | 426/3 |
| 4,511,685 | 4/1985 | Nissen et al. | 524/110 |
| 4,806,580 | 2/1989 | Bock et al. | 524/110 |

FOREIGN PATENT DOCUMENTS

| | | |
|---|---|---|
| 384 472 | 8/1990 | European Pat. Off. . |
| 542 108 | 5/1993 | European Pat. Off. . |
| 74/004053 | 12/1970 | Japan . |
| 54/034352 | 8/1977 | Japan . |
| 54/074851 | 6/1979 | Japan . |
| 58/127653 | 1/1982 | Japan . |
| 90/07547 | 7/1990 | WIPO . |

*Primary Examiner*—Kriellion S. Morgan
*Attorney, Agent, or Firm*—Keil & Weinkauf

[57] ABSTRACT

A thermoplastic molding material consists of

A) 30–80% by weight, based on A+B, of an elastomeric grafting base A defined in more detail and B) 20–70% by weight, based on A+B, of a shell grafted onto the grafting base A and defined in more detail and C) 0.001–1 part by weight, based on 100 parts by weight of A+B, of α-tocopherol and D) from a half to ten times the amount, based on C, of a thiodipropionic ester selected from dilauryl and distearyl thiodipropionate.

13 Claims, No Drawings

THERMOPLASTIC MOLDING MATERIAL

The present invention relates to a thermoplastic molding material comprising an acrylate graft rubber having improved heat-aging resistance.

It is known that α-tocopherol (vitamin E) can be used as a natural antioxidant for stabilizing certain polymers. For the production of packaging material for photosensitive materials, EP-A-0 384 472 discloses thermoplastics, including ABS, which are stabilized with vitamin E and additionally contain a light stabilizer. Inter alia, the use of dilauryl and distearyl thiodipropionate as antioxidants is also mentioned. JP 40/07053 describes the use of α-tocopherol as a nontoxic stabilizer for SBR and isoprene rubbers. U.S. Pat. No. 4,489,099 discloses mixtures of vitamin E (α-tocopherol) and dilauryl thiodipropionate for stabilizing chewing gum materials based on SBR rubber. In JP 58/127653, tocopherol and lecithin are added to a polybutadiene obtained by solution polymerization, in order to prevent pronounced nitrosamine formation during vulcanization. JP 54/034352 relates to mixtures of tocopherol (of the α-, β- or γ-type) with thiodipropionic esters for stabilizing polyolefin powders. JP 54/074851 describes PVC materials toughened with MBS rubbers, the MBS latex being brought into contact with a latex which contains a stabilizer mixture of tocopherol with thiodipropionic esters.

For the stabilization of polyethylene-containing plastics materials, EP-A-0 542 108 describes mixtures of a tocopherol compound, e.g. α-tocopherol, with a phosphorus- or sulfur-containing antioxidant, thiodipropionic esters, including distearyl thiodipropionate, also being mentioned.

WO 90/07547 discloses stabilizer mixtures comprising α-tocopherol and mono-, di- and/or triesters of glycerol with saturated or unsaturated fatty acids or mixtures thereof for stabilizing thermoplastics, such as polyvinyl chloride, styrene polymers, polyamides, polycarbonates, polyesters and polyolefins. In addition to the stated stabilizer mixture, the addition of further stabilizers, for example of calcium stearate and distearyl thiodipropionate, is also disclosed.

It is an object of the present invention to stabilize graft rubbers, in particular to increase the heat-aging resistance.

We have found that this object is achieved, surprisingly, by a thermoplastic molding material comprising graft rubber and a stabilizer mixture as defined in claim 1, in particular one which is obtained by mixing the graft rubber with an emulsion consisting of a mixture of α-tocopherol with a thiodipropionic ester.

The present invention therefore relates to thermoplastic molding materials consisting of A) 30–80% by weight, based on A+B, of an elastomeric grafting base comprising, based on A,
   A1) 90–99.9% by weight of at least one alkyl acrylate where the alkyl radical is of 1 to 8 carbon atoms and
   A2) 0.1–10% by weight of at least one polyfunctional, crosslinking monomer,
and
B) 20–70% by weight, based on A+B, of a shell grafted onto the grafting base and comprising, based on B,
   B1) 0–100% by weight of a vinylaromatic monomer, preferably styrene, or alkylstyrenes, preferably α-methylstyrene, and/or
   B2) 0–100% by weight of at least one polar, copolymerizable unsaturated monomer, preferably acrylonitrile, methyl methacrylate or phenylmaleimide,
   the sum of B1 and B2 being 100% by weight,
and C) 0.001–1 part by weight, based on 100 parts by weight of A+B, of α-tocopherol
and
D) from half to ten times the amount, based on C, of a thiodipropionic ester selected from dilauryl and distearyl thiodipropionate
and
E) 0–95 parts by weight, based on A+B+C+D+E, of a hard matrix consisting of, based on E,
   E1) 60–90% by weight of styrene and/or α-methylstyrene and
   E2) 10–40% by weight of acrylonitrile, the sum of E1 and E2 being 100% by weight, and
   E3) 0–40 parts by weight, based on 100 parts by weight of E, of PMMA
and, if required,
F) conventional additives in effective amounts.

The present invention furthermore relates to a process for the preparation of the thermoplastic molding materials, in particular the preparation of the stabilizer mixtures. The present invention furthermore relates to the use of the molding material for the production of moldings and to the moldings produced therefrom. These subjects of the invention are defined in the claims.

The preparation of the elastomeric grafting base A and of the graft based on polyalkyl acrylate-g-SAN is described in German Patent 1,260,135 and U.S. Pat. No. 3,055,859 and, for grafting in two stages, in DE-A-31 49 358 and DE-A-32 27 555. First, the rubber-like acrylate polymer serving as grafting base A is prepared by emulsion polymerization of acrylates. A mixture of vinylaromatic monomers B1 with a polar, copolymerizable unsaturated monomer B2 is grafted onto this resulting polyacrylate latex, the graft copolymerization likewise preferably being carried out in emulsion. The elastomeric component A may also be grafted, as described in EP 132 339, onto a hard core which may be crosslinked with the monomers stated under A2 and is composed of the monomers stated for B. Said core is preferably a hard core having a $T_g$ of >25° C., the amount of the core being 5–50% by weight, based on A+B. In order to obtain ASA polymers having good mechanical properties, the polyacrylate rubber used as the grafting base is crosslinked, i.e. the acrylates are copolymerized with small amounts of polyfunctional, crosslinking monomers A2 during its preparation.

The alkyl acrylates where the alkyl radical is of 1 to 8, particularly preferably 4 to 8, carbon atoms are preferred as monomers A1 for the preparation of the acrylate polymers. n-Butyl acrylate and ethylhexyl acrylate are particularly suitable. In the preparation of the acrylate polymers serving as the grafting base, the acrylates can be used alone or as a mixture with one another.

Particularly suitable polyfunctional crosslinking monomers A2 are monomers which contain two or more ethylenic double bonds which are capable of copolymerization and are not conjugated in the 1,3-positions. Examples of suitable crosslinking monomers are divinylbenzene, diallyl maleate, diallyl fumarate and diallyl phthalate. The acrylate of tricyclodecenyl alcohol has proven a particularly advantageous crosslinking monomer (cf. German Patent 1,260,135).

The preparation of the graft copolymer from the components A+B is known per se and can be carried out, for example, by the method described in German Patent 1,260,135. For this purpose, the elastomeric polymer, the grafting base A, is first prepared by polymerizing the acrylate or acrylates A1 and the polyfunctional, cross-linking monomer A2 in aqueous emulsion in a manner known per se at from 20° to 100° C., preferably from 50° to 80° C. The conventional emulsifiers, such as alkali metal salts of alkanesulfonic or alkylarylsulfonic acids, alkylsulfates, fatty alcohol sulfonates, salts of higher fatty acids of 10 to 30 carbon atoms or resin soaps, may be used. The polymerization initiators used are in particular the conventional persulfates, e.g. potassium persulfate, but redox systems may also be used. The polymerization assistants employed may be the conventional buffer substances, by means of which a pH of, preferably, from 6 to 9 is established, for example sodium bicarbonate and sodium pyrophosphate, and 0–3% by weight of a molecular weight regulator, such as a mercaptan, a terpinol or dimeric α-methylstyrene.

Suitable vinylaromatic monomers B1 for the preparation of the shell B grafted onto the grafting base A are styrene, alkylstyrenes, preferably α-methylstyrene, and styrenes alkylated in the nucleus, such as p-methylstyrene and tert-butylstyrene. Examples of preferred polar, copolymerizable unsaturated monomers B2 are acrylonitrile, alkyl (meth) acrylates where the alkyl radical is of 1 to 4 carbon atoms, acrylic acid, maleic anhydride, phenylmaleimide, acrylamide and/or vinyl methyl ether. Acrylonitrile, methyl methacrylate and phenylmaleimide are particularly preferred. The graft copolymerization can advantageously be carried out in the same system as the emulsion polymerization for the preparation of the grafting base A.

In a preferred embodiment of the invention, the one-stage graft copolymerization, the emulsion of the graft copolymer is polymerized with a mixture of the monomers B1 and B2, preferably in aqueous emulsion, according to German Patent 1,260,135.

In another preferred embodiment of the invention, in which the grafting is effected in two stages, the vinylaromatic monomer B1 is first polymerized in the presence of the grafting base A, this step being carried out according to DE-A-31 49 358 or DE-A-32 27 555. In the second stage, the graft copolymerization is then carried out with a mixture of at least one vinylaromatic monomer B1 and at least one polar, copolymerizable monomer B2. The conditions should be chosen so that the graft B contains 0–100, preferably 20–90, particularly preferably 40–85, % by weight of monomer B1 and 0–100, preferably 10–80, particularly preferably 15–60, % by weight of monomer B2, the percentages in each case being based on B. The total graft B accounts for 20–70, preferably 25–65, particularly preferably 25–60, % by weight, based on the graft copolymer comprising A+B. The amount of the elastomeric grafting base A is thus 30–80, preferably 35–75, particularly preferably 40–75, % by weight, based on A+B.

In a preferred embodiment, for the preparation of the stabilizer emulsion, the components C and D are melted together at 60°–70° C. with a carboxylic acid of 14 to 24 carbon atoms, preferably stearic acid. A base, in particular an aqueous KOH solution, is then added with thorough stirring. In an alternative embodiment, the components C and D are melted together and dispersed in an aqueous solution containing an emulsion stabilizer. A suitable emulsion stabilizer is potassium stearate, alkyl sulfonate or a sulfosuccinic ester. In each of the stated embodiments, an emulsion which remains stable over several days is obtained.

α-Tocopherol is used as component C. Component D is a thiodipropionic ester selected from the dilauryl and distearyl esters. Preferably, component D is dilauryl thiopropionate. For the preparation of the stabilized graft rubber emulsion, the emulsion of the unstabilized graft rubber latex is mixed with one of the abovementioned stabilizer emulsions so that the amount of α-tocopherol is 0.001–1, preferably 0.001–0.8, in particular 0.005–0.75, parts by weight, based in each case on 100 parts by weight of A+B, and the amount of component D is from a half to 10, preferably from a half to 8, particularly preferably from a half to 5, times the amount, based on C. The resulting mixture is coagulated by adding a salt, e.g. magnesium sulfate, then dewatered and processed to give the novel thermoplastic molding materials.

In a particularly preferred embodiment of the invention, the molding material contains up to 95, preferably 5 to 90, parts by weight, based on 100 parts by weight of A+B+C+D+E, of a hard matrix E comprising a copolymer of styrene and/or α-methylstyrene (component E1) with acrylonitrile (component E2) and, if required, PMMA. The amount of styrene and/or α-methylstyrene is 60–90, preferably 62–85, particularly preferably 72–84, % by weight, based on E, the sum of E1 and E2 being 100% by weight. The amount of PMMA (component E3) is 0–40, preferably 0–35, particularly preferably 0–30, parts by weight, based on 100 parts by weight of E.

The additional hard matrix E can be obtained by the conventional, known methods, as also described in DE-A-31 49 358 and DE-A-32 27 555. Thus, the copolymerization of the styrene and/or α-methylstyrene with the acrylonitrile can be carried out as a mass, solution, suspension or aqueous emulsion polymerization.

In a further preferred embodiment, additives, as a further component F and as usually used for ASA polymers, are added to the mixture of the components A, B, C, D and, if required, E. Examples of suitable additives are fillers, further compatible plastics, antistatic agents, antioxidants, flame-proofing agents and lubricants. The additives are used in conventional amounts, preferably in amounts of from 0.1 to a total of 30 parts by weight, based on 100 parts by weight of the mixture (A+B+C+D+E+F).

The improved heat-aging resistance of the novel acrylate graft rubber can be established on the one hand from the firstly precipitated and dried graft rubber by measuring the time which elapses under defined conditions until an exothermic reaction occurs. On the other hand, the stabilization can also be determined for the finished product by storing moldings produced from the novel molding materials at elevated temperatures and observing the color change. In both cases, it is found that the graft rubber or molding stabilized according to the invention remains stable for longer than a comparable unstabilized graft rubber.

The novel molding materials are suitable for the production of moldings, in particular of window profiles, garden furniture, boats, signs, lamp coverings and automotive parts. The novel molding materials are particularly suitable for the production of moldings which have to have high impact strength in combination with good weather resistance and aging resistance.

The example which follows illustrates the invention.

EXAMPLE

Poly-n-butyl acrylate-g-SAN graft rubber was prepared according to Example 1 of German Patent 1,260,135, the solids content being 40% by weight. For the preparation of the stabilizer mixture, 20 g of α-tocopherol and/or dilauryl thiodipropionate in accordance with the table below were melted with 2 g of stearic acid at 60°–80° C. 40 g of 0.1% strength KOH were then added to the melt with thorough stirring. The corresponding stabilizer mixtures were added, in accordance with the table below, to the polymer emulsion of the graft rubber and mixing was carried out. The latex thus obtained was coagulated by precipitation by means of a magnesium sulfate solution and dewatered.

The graft rubber powder thus obtained is subjected to thermal stress in air at 260° C. The time which elapses before the graft rubber suffers exothermic oxidation damage is a measure of the quality of the mixture.

TABLE

| Example no. | α-Tocopherol, parts by weight based on 100 parts by weight of (A + B)** | Dilauryl thiodipropionate, parts by weight based on 100 parts by weight of (A + B)** | $t_z$*, min |
| --- | --- | --- | --- |
| 1 (comparison) | — | — | 208 |
| 2 (comparison) | — | 0.2 | 221 |
| 3 (comparison) | 0.2 | — | 210 |
| 4 (according to the invention) | 0.05 | 0.2 | 262 |

*)Time until decomposition occurs (according to DSC, maximum of the exothermic peak)
**)100 parts by weight of graft rubber As is evident from the table, the novel polymer materials are stable on storage in air at 260° C. for a longer time than polymer materials to which a combination of α-tocopherol and dilauryl thiodipropionate was not added. Accordingly, the invention leads to graft rubbers having improved heat-aging resistance.

We claim:
1. A thermoplastic molding material consisting of
   A) 30–80% by weight, based on A+B, of an elastomeric grafting base comprising, based on A,
      A1) 90–99.9% by weight of at least one alkyl acrylate where the alkyl radical is of 1 to 8 carbon atoms and
      A2) 0.1–10% by weight of at least one polyfunctional, crosslinking monomer,
   and
   B) 20–70% by weight, based on A+B, of a shell grafted onto the grafting base A and comprising, based on B,
      B1) 0–100% by weight of a vinylaromatic monomer, preferably styrene, or alkylstyrenes, preferably α-methylstyrene, or
      B2) 0–100% by weight of at least one polar, copolymerizable unsaturated monomer, preferably acrylonitrile, methyl methacrylate or phenylmaleimide,
      the sum of B1 and B2 being 100% by weight,
   and
   C) 0.001–1 part by weight, based on 100 parts by weight of A+B, of α-tocopherol
   and
   D) from half to ten times the amount, based on C, of a thiodipropionic ester selected from dilauryl and distearyl thiodipropionate
   and
   E) 0–95 parts by weight, based on 100 parts by weight of A+B+C+D+E, of a hard matrix consisting of, based on E,
      E1) 60–90% by weight of styrene or α-methylstyrene and
      E2) 10–40% by weight of acrylonitrile, the sum of E1 and E2 being 100% by weight, and
      E3) 0–40 parts by weight, based on 100 parts by weight of E, of poly(methyl methacrylate)
   and, optionally,
   F) conventional additives in amounts of from 0.1 to 30 parts by weight, based on 100 parts of the mixture (A+B+C+D+E+F).
2. A molding material as claimed in claim 1, wherein component A is grafted onto a hard core K which may be crosslinked with the monomers stated for A2, has a $T_g$ of >25° C. and consists of the monomers stated for B, the amount of the core being 5–50% by weight, based on A+B.
3. A molding material as claimed in claim 1 or 2, wherein component D is dilauryl thiodipropionate.
4. A process for the preparation of a molding material consisting of
   A) 30–80% by weight, based on A+B, of an elastomeric grafting base comprising, based on A,
      A1) 90–99.9% by weight of at least one alkyl acrylate where the alkyl radical is of 1 to 8 carbon atoms and
      A2) 0.1–10% by weight of at least one polyfunctional, crosslinking monomer,
   and
   B) 20–70% by weight, based on A+B, of a shell grafted onto the grafting base A and comprising, based on B,
      B1) 0–100% by weight of a vinylaromatic monomer, preferably styrene, or alkylstyrenes, preferably α-methylstyrene, or
      B2) 0–100% by weight of at least one polar, copolymerizable unsaturated monomer, preferably acrylonitrile, methyl methacrylate or phenylmaleimide,
      the sum of B1 and B2 being 100% by weight,
   and
   C) 0.001–1 part by weight, based on 100 parts by weight of A+B, of α-tocopherol
   and
   D) from half to ten times the amount, based on C, of a thiodipropionic ester selected from dilauryl and distearyl thiodipropionate
   and
   E) 0–95 parts by weight, based on 100 parts by weight of A+B+C+D+E, of a hard matrix consisting of, based on E,
      E1) 60–90% by weight of styrene or α-methylstyrene and
      E2) 10–40% by weight of acrylonitrile, the sum of E1 and E2 being 100% by weight, and
      E3) 0–40 parts by weight, based on 100 parts by weight of E, of poly(methyl methacrylate)
   and, optionally,
   F) conventional additives in amounts of from 0.1 to 30 parts by weight, based on 100 parts of the mixture (A+B+C+D+E+F), wherein the improvement which comprises adding the stabilizer mixture of C and D as an emulsion to the emulsion of the graft copolymer of A and B and then effecting precipitation.
5. A process as claimed in claim 4, wherein component A is grafted onto a hard core K which may be crosslinked with the monomers stated for A2, has a $T_g$ of >25° C. and consists of the monomers stated for B, the amount of the core being 5–50% by weight, based on A+B.
6. A process as claimed in claim 4, wherein component D is dilauryl thiodipropionate.
7. A process as claimed in claim 4, wherein the stabilizer mixture is prepared by mixing components C and D, melting the mixture with stearic acid and then adding a base, preferably KOH.
8. A process as claimed in claim 4, wherein the stabilizer mixture is prepared by mixing components C and D and then adding an aqueous emulsifier solution, preferably potassium stearate, an alkyl sulfonate or a sulfosuccinic ester.
9. A process for the production of moldings comprising utilizing a molding material, consisting of
   A) 30–80% by weight, based on A+B, of an elastomeric grafting base comprising, based on A,

A1) 90–99.9% by weight of at least one alkyl acrylate where the alkyl radical is of 1 to 8 carbon atoms and A2) 0.1–10% by weight of at least one polyfunctional, crosslinking monomer, and B) 20–70% by weight, based on A+B, of a shell grafted onto the grafting base A and comprising, based on B, B1) 0–100% by weight of a vinylaromatic monomer, preferably styrene, or alkylstyrenes, preferably α-methylstyrene, or B2) 0–100% by weight of at least one polar, copolymerizable unsaturated monomer, preferably acrylonitrile, methyl methacrylate or phenylmaleimide, the sum of B1 and B2 being 100% by weight, and C) 0.001–1 part by weight, based on 100 parts by weight of A+B, of α-tocopherol and D) from half to ten times the amount, based on C, of a thiodipropionic ester selected from dilauryl and distearyl thiodipropionate and E) 0–95 parts by weight, based on 100 parts by weight of A+B+C+D+E, of a hard matrix consisting of, based on E, E1) 60–90% by weight of styrene or α-methylstyrene and E2) 10–40% by weight of acrylonitrile, the sum of E1 and E2 being 100% by weight, and E3) 0–40 parts by weight, based on 100 parts by weight of E, of PMMA and, optionally, F) conventional additives in effective amounts.

10. A process as claimed in claim 9, wherein component A is grafted onto a hard core K which may be crosslinked with the monomers stated for A2, has a $T_g$ of >25° C. and consists of the monomers stated for B, the amount of the core being 5–50% by weight, based on A+B.

11. A process as claimed in claim 9, wherein, after the preparation of the graft copolymer of A and B, the stabilizer mixture consisting of C and D is added as an emulsion to the emulsion of the graft copolymer and precipitation is then effected.

12. A molding obtained from a molding material consisting of

A) 30–80% by weight, based on A+B, of an elastomeric grafting base comprising, based on A, A1) 90–99.9% by weight of at least one alkyl acrylate where the alkyl radical is of 1 to 8 carbon atoms and A2) 0.1–10% by weight of at least one polyfunctional, crosslinking monomer.

and

B) 20–70% by weight, based on A+B, of a shell grafted onto the grafting base A and comprising, based on B, B1) 0–100% by weight of a vinylaromatic monomer, preferably styrene, or alkylstyrenes, preferably α-methylstyrene, or B2) 0–100% by weight of at least one polar, copolymerizable unsaturated monomer, preferably acrylonitrile, methyl methacrylate or phenylmaleimide, the sum of B1 and B2 being 100% by weight, and C) 0.001–1 part by weight, based on 100 parts by weight of A+B, of α-tocopherol and D) from half to ten times the amount, based on C, of a thiodipropionic ester selected from dilauryl and distearyl thiodipropionate and E) 0–95 parts by weight, based on 100 parts by weight of A+B+C+D+E, of a hard matrix consisting of, based on E, E1) 60–90% by weight of styrene or α-methylstyrene and E2) 10–40% by weight of acrylonitrile, the sum of E1 and E2 being 100% by weight, and E3) 0–40 parts by weight, based on 100 parts by weight of E, of poly(methyl methacrylate)

and, optionally,

F) conventional additives in amounts of from 0.1 to 30 parts by weight, based on 100 parts of the mixture (A+B+C+D+E+F).

13. A molding obtained from a molding material as claimed in claim 2.

* * * * *